United States Patent [19]

Muller

[11] 4,011,645
[45] Mar. 15, 1977

[54] STEERING WHEEL METHOD OF MANUFACTURE

[75] Inventor: George H. Muller, Ann Arbor, Mich.

[73] Assignee: Ford Motor Company, Dearborn, Mich.

[22] Filed: Dec. 19, 1975

[21] Appl. No.: 642,518

[52] U.S. Cl. .............. 29/159 B; 29/509; 29/513; 74/492; 74/552

[51] Int. Cl.² ...................... B21D 53/26

[58] Field of Search ........... 29/159 B, 460, 469, 29/509, 513, 527.1, 527.2, 527.3, 527.4, 173; 74/552, 470, 492

[56] References Cited

UNITED STATES PATENTS

| 1,920,423 | 8/1933 | Mitchell | 29/159 B X |
| 2,041,739 | 5/1936 | Beck | 29/159 B X |
| 2,425,240 | 8/1947 | George | 74/552 |
| 2,810,301 | 10/1957 | Mathues | 74/552 |
| 2,909,941 | 10/1959 | Guest | 74/552 |
| 3,321,996 | 5/1967 | Cardinale | 74/552 |
| 3,468,188 | 9/1969 | MacCoon | 29/159 B X |

Primary Examiner—Victor A. DiPalma
Attorney, Agent, or Firm—Clifford L. Sadler; Keith L. Zerschling

[57] ABSTRACT

A steering wheel for a motor vehicle made according to the present disclosure includes the steps of making a flexible rim assembly by forming a plurality of annular leaf springs and stacking them together. The rim assembly is secured to the steering wheel spokes by fitting the assembly into channel shape attachment members welded to the spokes and then crimping tabs on the attachment members into gripping engagement with the rim assembly.

6 Claims, 5 Drawing Figures

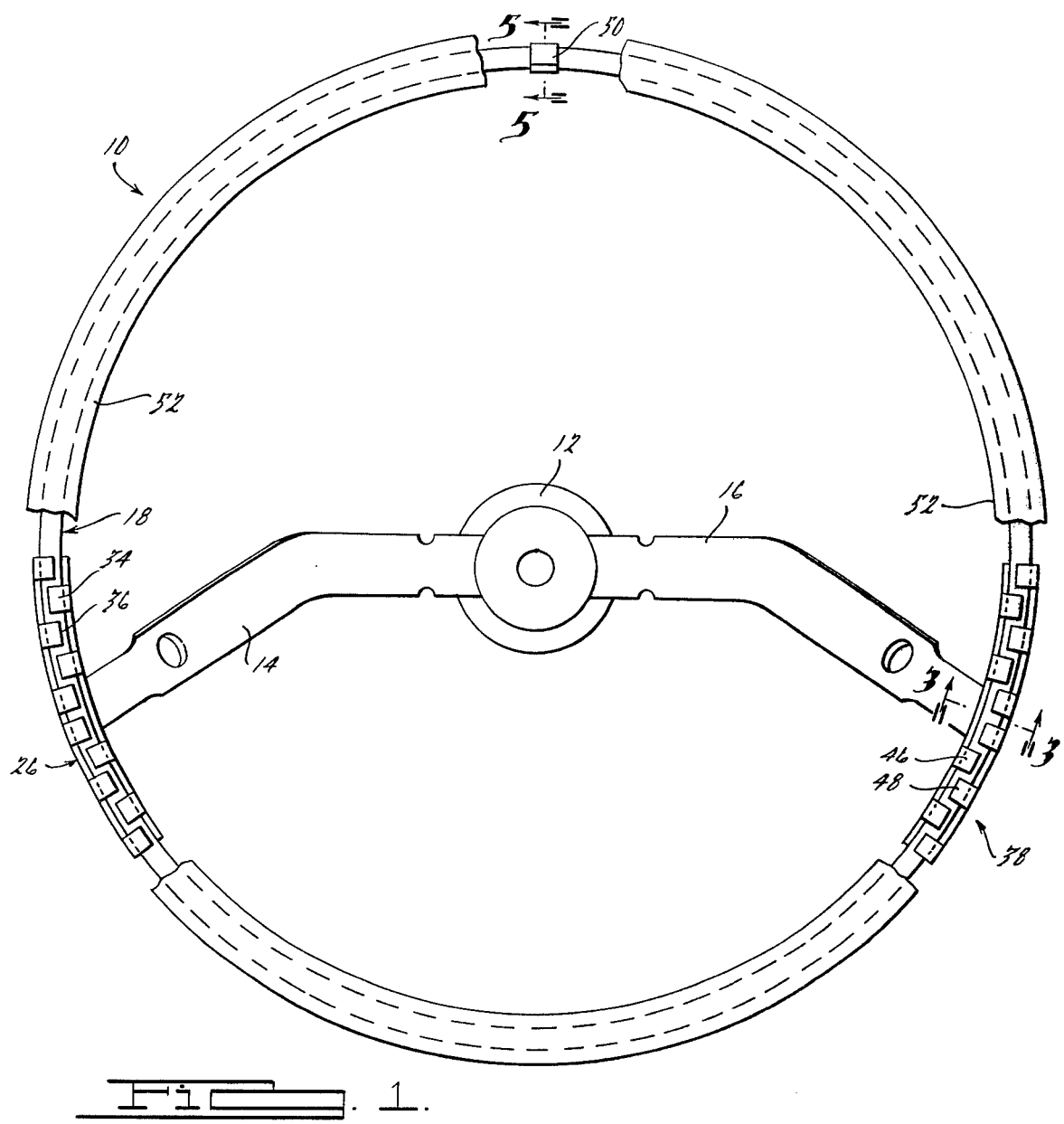
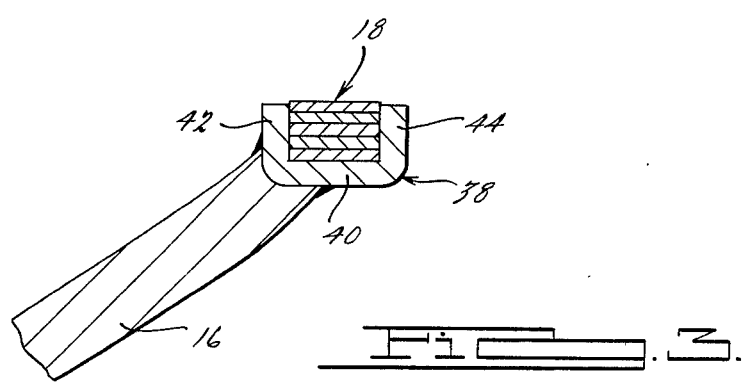

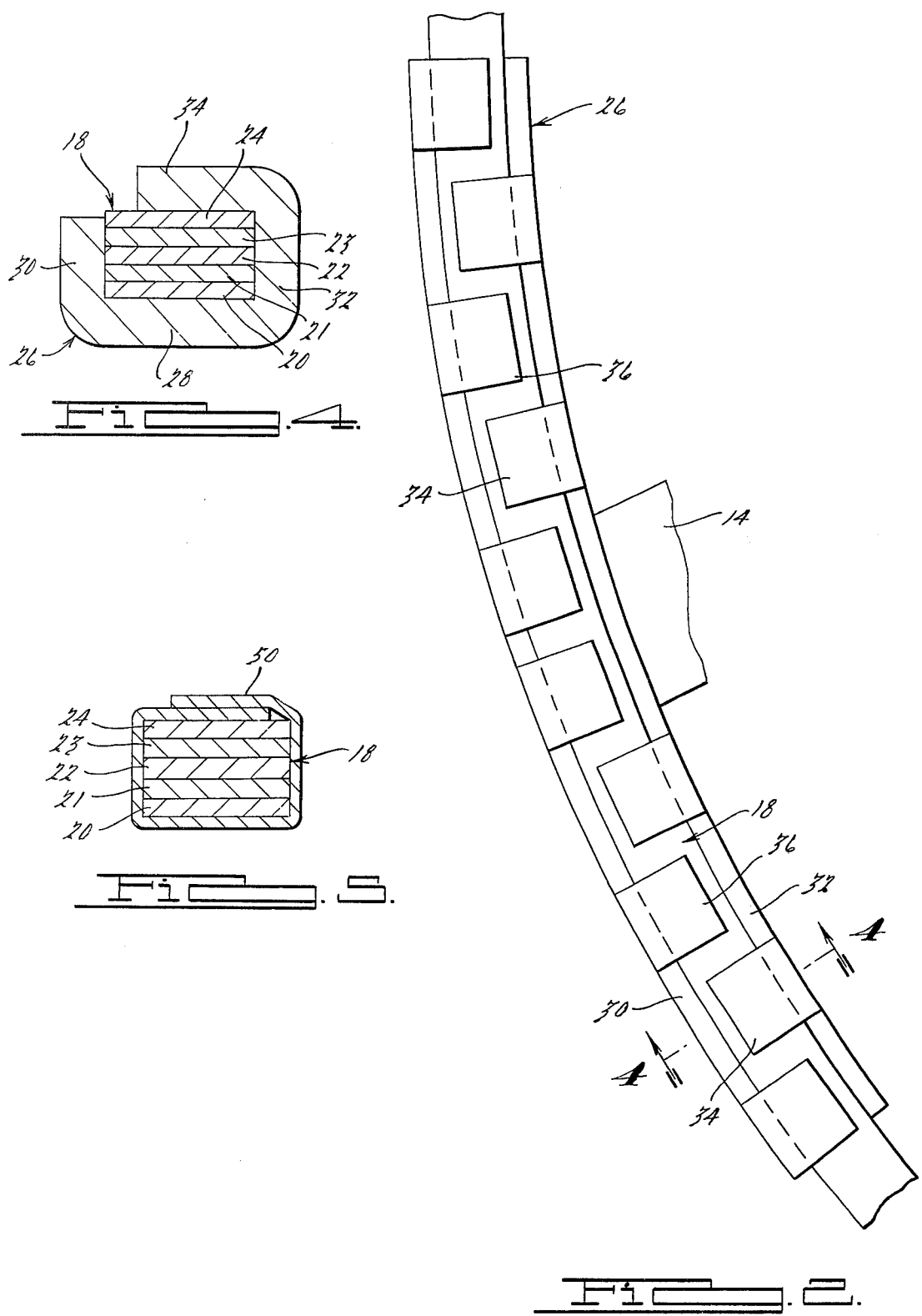

STEERING WHEEL METHOD OF MANUFACTURE

BACKGROUND OF THE DISCLOSURE

The present invention relates to steering wheels for motor vehicles, and more particularly to a method for making a steering wheel having a resilient rim that is deflectable under an impact load. Deflection of the rim causes a portion of the load to be absorbed. A steering wheel according to the present disclosure provides an improvement over prior art steering wheels such as shown in U.S. Pat. Nos. 3,321,996 and 3,456,526.

BRIEF SUMMARY OF THE DISCLOSURE

A steering wheel made according to the present disclosure has a hub from which a pair of spokes radiate. A rim core is secured to the outer ends of the spokes. The rim core comprises a stack of leaf springs each of which is circular in the plan view and has a flat upper surface perpendicular to the axis of rotation of the steering wheel.

A pair of attachment members which have an arcuate shape in the plan view are welded to the outer ends of the spokes. The attachment members have a channel shape cross section formed by arcuate side walls interconnected by a bottom wall. Tabs are formed along the edges of the side walls. The plurality of circular leaf springs are positioned between the side walls of the attachment members and the tabs are crimped over to clamp the plurality of springs in position. The spokes and rim core are enclosed by a plastic covering to provide a convenient gripping surface for a vehicle operator.

The steering wheel provides a rim which is resiliently deflectable under an impact load imposed upon it in a direction parallel to the axis of the wheel. The rim is rigid with respect to forces in the plane of the rim whereby the rim will not deflect when it is gripped by a vehicle operator and a tangential force is applied for the purpose of rotating the wheel.

BRIEF DESCRIPTION OF THE DRAWINGS

The many objects and advantages of a steering wheel constructed in accordance with this invention will become apparent upon consideration of the following detailed discussion taken in association with the accompanying drawings, in which:

FIG. 1 is a plan view of a steering wheel in accordance with the invention with a portion of the plastic covering removed to show the construction of the rim core and the spokes;

FIG. 2 is an enlarged plan view of the attachment between the rim core and the left steering wheel spoke;

FIG. 3 is a sectional view taken along section line 3—3 of FIG. 1;

FIG. 4 is a sectional view taken along section line 4—4 of FIG. 2; and

FIG. 5 is a sectional view taken along section line 5—5 of FIG. 1.

DETAILED DESCRIPTION OF PRESENTLY PREFERRED EMBODIMENT

Referring now to the drawings wherein the presently preferred embodiment of this invention is illustrated, a steering wheel 10 suitable for use in a motor vehicle is disclosed in FIG. 1. The steering wheel 10 includes a hub 12 that may be attached to a steering shaft. Left and right spokes 14 and 16 radiate from the steering wheel hub 12. The outer ends of the spokes 14 and 16 are angled downwardly in dogleg fashion and are attached to a rim core assembly 18.

The rim core assembly 18 comprises a stack of leaf springs 20, 21, 22, 23 and 24. Each of the springs 20 to 24 is a leaf spring member having a rectangular shape in cross section and a circular annular shape in the plan view. Each of the leaf springs 20 and 24 has a flat upper surface that lies in a plane perpendicular to the axis of rotation of the steering wheel 10.

The means by which the rim core assembly 18 is attached to the spokes 14 and 16 will now be described. A member 26 having an arcuate shape in the plan view and a channel shape in cross section is welded to the outer end of the spoke 14. The channel shape of the member 26 is formed by a bottom wall 28 and aracuate side walls 30 and 32. The stack of leaf spring members 20 to 24 are positioned upon the bottom wall 28 and between the side walls 30 and 32. A row of inner tabs 34 are formed along the upper edge of the inner wall 32. Similarly, a row of tabs 36 are formed along the edge of the outer wall 30. With the stack of leaf spring members 20 to 24 positioned between the inner and outer walls 30 and 32, the tabs 34 and 36, which originally extended upwardly, are alternately bent over in interdigital fashion to provide a clamping force securing the core assembly 18 in the channel shape member 26.

In a similar manner, a channel member 38 is welded to the outer end of the right spoke 16. The channel member 38 comprises a bottom 40 and side walls 42 and 44. Spaced apart tabs 46 and 48 are formed along the upper edges of the inner and outer side walls 42 and 44. The stacked set of leaf springs 20 to 24 are positioned between the side walls 42 and 44 and the tabs 46 and 48 are bent over to secure the leaf springs within the member 38.

A metal band or strap 50 encircles the circular leaf springs 20 to 24 at a location in the middle of the upper half of the rim core assembly 18. The strap 50 serves to hold the circular leaf springs 20 to 24 in position during the manufacture of the wheel.

The wheel 10 of FIG. 1 is fabricated in the following fashion. The hub 12 is machined and spokes 14 and 16 are welded thereto in the relationship shown in FIG. 1. The channel members 26 and 38 are welded to the outer ends of the spokes 14 and 16. The leaf springs 20 to 24 are each formed as a continuous one-piece loop. The springs 20 and 24 are stacked one on top of the other and then encircled by the strap 50. The stacked set of springs 20 to 24 are positioned in the channel members 26 and 38. The tab members 34 and 36 of channel member 26 are crimped over to securely grip the spring leaves 20 to 24 between the side walls 30 and 32 of channel member 26. Similarly, with the spring leaves 20 to 24 positioned between the side walls 42 and 44 of the right support member 38, the tabs 46 and 48 are crimped over into tight gripping engagement with the leaf springs 20 to 24. Because the members 20 to 24 are fabricated from spring steel, the crimping method for attaching them to the members 26 and 38 is advantageous.

The construction of the wheel 10 is completed by enclosing the hub 12 and the spokes 14 and 16 in a decorative plastic cover. The rim assembly 18 and the attachment brackets 26 and 38 are enclosed by a molded in place plastic covering 52 which provides a surface that may be gripped by a vehicle operator.

The steering wheel 10 is characterized by its resiliency in a direction parallel to the axis of rotation of the wheel. If an impact load is imposed upon the rim in a direction parallel to the axis of the wheel 10, the rim will resiliently deflect to absorb a portion of the load. On the other hand, the rim is rigid with respect to forces in the plane of the rim. When the vehicle operator places his hand upon the rim and applies a generally tangential force for the purpose of rotating the wheel 10, the wheel rim will not be distorted.

The foregoing description presents the presently preferred embodiment of this invention. Details of construction have been disclosed for purposes of illustration and are not to be considered as limitations of the invention. Modifications and alterations of the invention may occur to those skilled in the art which will come within the scope and spirit of the following claims.

I claim:

1. A method of manufacturing a steering wheel for a motor vehicle comprising the steps of:
    attaching a spoke to a steering wheel hub;
    affixing a channel shape attachment member to the outer end of said spoke;
    forming a flexible rim core from an annular leaf spring member;
    fitting a portion of said rim core in said channel shape attachment member;
    deforming said attachment member into gripping engagement with said rim core;
    covering said rim core with a member having a hand gripping surface.

2. A method of manufacturing a steering wheel for a motor vehicle comprising the steps of:
    attaching a spoke to a steering wheel hub;
    affixing an attachment member having a pair of spaced walls to the outer end of said spoke;
    forming a flexible rim core comprising a leaf spring member;
    fitting a portion of said rim core between said pair of spaced walls;
    crimping portions of the edges of said pair of spaced walls into gripping engagement with said rim core;
    covering said rim core with a member having a hand gripping surface.

3. A method of manufacturing a steering wheel for a motor vehicle comprising the steps of:
    attaching a spoke to a steering wheel hub;
    forming a flexible rim core by stacking a plurality of annular flat leaf springs in flush interengagement;
    attaching said rim core to said spoke;
    covering said rim core with a member having a hand gripping surface.

4. A method of manufacturing a steering wheel according to claim 3 and including:
    affixing an attachment member having a pair of spaced walls to the outer end of said spoke;
    fitting a portion of said rim core between said pair of spaced walls;
    deforming portions of said pair of spaced walls into gripping engagement with said rim core.

5. A method of manufacturing a steering wheel for a motor vehicle comprising the steps of:
    attaching a spoke to a steering wheel hub;
    affixing a channel shape attachment member to the outer end of said spoke;
    said attachment member having spaced apart side walls with a plurality of tabs formed along the edges of said walls;
    fitting an annular leaf spring member between said pair of spaced walls;
    crimping said tabs into gripping engagement with said spring member;
    covering said rim core with a member having a hand gripping surface.

6. A method of manufacturing a steering wheel for a motor vehicle comprising the steps of:
    attaching a spoke to a steering wheel hub;
    affixing a channel shape attachment member to the outer end of said spoke;
    said attachment member having spaced apart side walls with a plurality of tabs formed along the edges of said walls;
    forming a flexible rim core by stacking a plurality of annular flat leaf springs in flush interengagement;
    fitting a portion of said rim core between said pair of spaced walls;
    crimping said tabs into gripping engagement with said spring member;
    covering said rim core with a member having a hand gripping surface.

* * * * *